United States Patent

Fuma et al.

Patent Number: 5,405,570
Date of Patent: Apr. 11, 1995

[54] METHOD OF PREPARING A DURABLE AIR-PERMEABLE MOLD

[75] Inventors: Toyoji Fuma, Toyokawa; Kazuyuki Nishikawa, Toyohashi; Yojiro Hayashi, Toyokawa; Naoshi Makiguchi, Aichi; Takehiro Inagaki, Toyokawa; Koji Nishioka, Toyokawa; Mituo Kawaguchi, Shinshiro, all of Japan

[73] Assignee: Sintokogio, Ltd., Aichi, Japan

[21] Appl. No.: 213,715

[22] Filed: Mar. 16, 1994

[30] Foreign Application Priority Data

Oct. 8, 1993 [JP] Japan .................. 5-277500

[51] Int. Cl.$^6$ .................................. B22F 3/10
[52] U.S. Cl. .................................. 419/2; 419/36; 419/40; 419/57
[58] Field of Search .................. 419/2, 36, 40, 57

[56] References Cited

U.S. PATENT DOCUMENTS

| | | | |
|---|---|---|---|
| 1,873,223 | 8/1932 | Sherwood et al. | 419/2 |
| 1,893,330 | 8/1928 | Jones | 419/2 |
| 1,919,730 | 7/1933 | Koenig et al. | 419/2 |
| 2,122,053 | 6/1938 | Burkdardt et al. | 419/2 |
| 2,217,802 | 10/1940 | Koehring et al. | 419/2 |
| 5,041,159 | 8/1991 | Doyon et al | 75/232 |

FOREIGN PATENT DOCUMENTS

| | | | |
|---|---|---|---|
| 63-176380 | 7/1988 | Japan | C04B 38/08 |
| 63-65416 | 12/1988 | Japan | B22C 7/00 |
| 1-53140 | 11/1989 | Japan | B22C 1/00 |
| 2-6620 | 2/1990 | Japan | B29C 51/36 |
| 2-27925 | 6/1990 | Japan | B28B 1/26 |
| 3-23253 | 3/1991 | Japan | B22C 9/00 |

Primary Examiner—Donald P. Walsh
Assistant Examiner—Anthony R. Chi
Attorney, Agent, or Firm—Fish & Neave; Edward Etkin

[57] ABSTRACT

A method of preparing a durable air-permeable mold having dimensional accuracy and without cracks clue to the segregation of the ingredients of the aggregate and without a surface irregularity, which comprises compounding 100 parts by weight of an aggregate obtained by compounding metal powders with metal oxide powders in a weight ratio of 5:95 to 30:70, the metal of said metal oxide powders being the same as that of the metal powders, 80% or more of said metal powders and said metal oxide powders having grain sizes of 300 μm or less, with 10 to 35 by weight of an auxiliary hardening material that is softened and melted during the sintering process, and 10 to 25 by weight of a binder that contains an evaporable component, mixing them to form a slurry mixture, pouring it in a pattern mold to obtain a mold, drying the thus-obtained mold, and sintering the dried mold in an oxidative atmosphere at a temperature of 600° to 1200° C.

4 Claims, 2 Drawing Sheets

METHOD OF PREPARING A DURABLE AIR-PERMEABLE MOLD

BACKGROUND OF THE INVENTION

1. Field of the Invention

This invention relates to a method of preparing a durable air-permeable mold having fine and continuous pores all over it and having a fine pattern on its surface.

2. Prior Art

Such a durable air-permeable mold can be, for example, used for the vacuum-molding method. This method is one in which after a thermoplastic sheet is heated and softened, it is made to cover a mold, the air-permeable surface of which is subjected to suction, and then the air present between the surface of the mold and the thermoplastic sheet is withdrawn to cause the sheet to adhere to the surface of the mold.

Since this method has merits in that small to large molded products can be efficiently produced with relatively simple equipment, it has been widely utilized. Recently, fine patterns such as are obtained by embossing the surface of molded products are in demand to enhance the commercial value of molded products, or molds to obtain large molded products and high-dimensional accuracy are demanded.

Also, such durable porous molds can be widely used not only for vacuum-molding, but also for blow-molding and other methods that require air permeability. As molds that satisfy such requirements, as shown in Japanese Patent Publication No. 2-6620, the applicant has developed molds excellent in durability as well as having low costs, short-term delivery, and with good transferability and air-permeability.

Additionally, it has developed various air-permeable and water-permeable molds that are disclosed in Japanese Patent Publication Nos. 63-65416, 1-53140, 2-27925, 3-23253, etc.

All of these molds are obtained by mixing a liquid binder with a mixture of metal powders and ceramic powders or refractory powders, their specific gravities being very different, to form a slurry, casting the slurry into a pattern mold, solidifying the binder, drying the thus-obtained solid product, and then sintering the product in an oxidative atmosphere to oxidize and expand the metal powders to obtain an air-permeable mold with high strength, being sintered in a form such that the oxidized and expanded metal powders envelope the ceramic powders.

However, these molds have a drawback in that in the above slurry a mixture of the ingredients of the aggregate starts to precipitate before the binder solidifies, and when the binder is solidified the segregation of the ingredients occurs since a difference between the sedimentation rate of the metal powders and that of the ceramic powders is apt to be caused, said metal powders and ceramic powders significantly differing in their specific gravities.

For this reason the molds obtained by sintering the solidified product with the segregation produce cracks and a surface irregularity due to the segregation. Since these molds have very good transferability, such cracks and surface irregularity are transferred to a molded product. Thus it is difficult to obtain molds which can produce good molded products. Also, since the metal powders provide the strength, to obtain a high-strength mold the amount of metal powders tends to be high (for example, the amount of metal powders against the amount of ceramic powders can be 1:1). Accordingly, sintered molds tend to expand, and it is difficult to control dimensional accuracy.

SUMMARY OF THE INVENTION

The present invention was made in consideration of the above problems. It aims at providing a method of preparing a durable air-permeable mold without causing cracks or a surface irregularity due to the segregation of the ingredients of the aggregate.

As a basic concept to achieve the above object, ingredients of the aggregate were selected such that the difference in specific gravity, and thereby the difference in the sedimentation rate, is less, and an auxiliary bonding method was adopted to effect the binding upon sintering (the development of the strength of the mold), without just relying upon the oxidative expansion of metal powders.

Thus in the present invention, as the ingredients of the aggregate, the combination of metal powders and metal oxide powders is adopted, where the metal of said metal oxide powders being the same as that of the metal powders, and the difference in specific gravity and in sedimentation rate is small. The reason why the ingredients were not limited to metal oxide powders, but metal powders were also used, is that a bonding structure resulting from oxidizing the metal powders is expected and that the metal powders are used as a dimension-adjusting agent to obtain a mold having the same dimensions as those of the pattern by compensating for the contraction of a mold upon drying by the oxidative expansion of the metal powders. The reason why not only metal powders, but also metal oxide powders, are adopted, is that the use of only metal powders makes it difficult to adjust the dimensions, since the oxidative expansion of metal powders tends to be excessive, and thus the dimensions of the mold become greater than those of its pattern.

In the present invention, in addition to the bonding structure resulting from the oxidation of metal powders, an auxiliary hardening material consisting of frit or other materials is also used as the auxiliary binder, to obtain a sufficient strength for the mold after sintering. Since metal powders, which greatly contribute to the bonding structure of the aggregate, cannot be used in a large amount for the above reason, various experiments were conducted to compensate for this difficulty. As a result, it was found that extremely effective are materials such as frit, which can strongly bind the ingredients of the aggregate by "being softened and melted at a temperature at which metal powders are oxidized or at higher temperatures, and solidified after cooling."

A method by which a porous body is obtained by merely combining a material such as frit with an aggregate is known by Japanese Patent Early-publication No. 63-176380. However, there is no art in which frit etc. is used for a mold that requires the fine transferability as stated above and that increases the dimensional accuracy of the mold produced by the oxidative expansion of metal powders and that strengthens the binding obtainable by the oxidative expansion.

The present invention relates to a method to obtain a durable air-permeable mold, where metal powders and metal oxide powders are compounded to obtain an aggregate, an auxiliary hardening material such as frit that is softened and molten in the process of sintering is compounded with the aggregate, a binder containing an evaporable component is added, a slurry mixture is obtained by mixing these ingredients, and is cast into a master-pattern mold and solidified to form a mold, and after the mold is removed from the master-pattern mold the mold is dried to confer porosity and then sintered in an oxidative atmosphere. The present invention includes increasing the strength of a hardened product obtained before or after sintering by adding reinforcing fibers to the aggregate to facilitate the handling of the product.

DETAILED DESCRIPTION

The materials used in the method of the present invention will be explained below in detail.

1. Metal powders:

Metal powders are oxidatively expanded upon sintering and are sintered in such a manner that they envelope metal oxide powders. Diffusion bonding occurs at the boundaries of the metal powders.

As metal powders, iron powders, nickel powders, and cobalt powders are exemplified. Among these the use of iron powders is preferable if the less frequent occurrence of segregation, the low-cost aspect, and ready availability are taken into account.

2. Metal oxide powders:

The metal oxide powders need not necessarily be those in which the entire grains are completely oxidized. Metal powders in which the interior is partly unoxidized can also be used. First, the metal oxide powders that do not tend to produce segregation from metal powders are effective. They may be selected by considering the degree of oxidation depending on the sizes and shapes of metal powders and the metal oxide powders that are used. If the degree of oxidization is greater, the specific gravity is less, and the sedimentation rate is less. The greater the size of the grain, the faster the sedimentation rate.

Second, when those metal oxide powders with a low degree of oxidation are used, the volume of their expansion upon sintering also cannot be disregarded. Thus when the dimensional accuracy is considered it is necessary to consider their ratio of compounding with metal powders. When the difficulty in segregation from the metal powders, the low-cost aspect, and their ready availability, is considered, it is seen that the use of iron oxide powders is preferable.

3. Reinforcing fibers:

Although reinforcing fibers are not necessarily required, it is preferable to add them. Before sintering, the hardened product is solidified by the hardening of a binder, but it has a very low strength compared to its strength after sintering. However, by uniformly dispersing reinforcing fibers in the hardened product, the strength is increased before sintering and the handling of the product is greatly facilitated.

While after sintering the ingredients of the aggregate are diffusely bonded along their boundaries by oxidization and by frit, the fibers that are uniformly dispersed in the interior of the sintered product further increase the strength and prevent cracks, to increase the durability of the obtained mold as well as to increase the dimensional stability. As the reinforcing fibers, iron-, stainless-, and glass-types, can be used. Stainless-type reinforcing fibers are preferable. They are preferred because of their strong reinforcing effects in the sintered body without corrosion and without disappearing during the sintering process.

4. Auxiliary hardening materials:

Auxiliary hardening materials should be those that are softened and melted at temperatures at which the metal powders are oxidized and expanded and fusion-bonded on the boundaries of the ingredients of the aggregate, and after cooling they should be able to further bond the ingredients of the aggregate. Generally, frit, glaze, and glass powders can be used as auxiliary hardening materials.

It is needless to say that the melting temperature of the auxiliary hardening materials used is required to be below the melting points of the metal powders and the metal oxide powders that are the aggregate, and it is also required to be at the temperature at which the metal powders start oxidation, or higher. Thus those auxiliary hardening materials stated below, having melting temperatures below the sintering temperature, should be selected. As a result of various experiments, although depending on the kinds of metal powders and of auxiliary hardening materials, such as frit, used, when the difference between the sintering temperature and the melting temperature is 10°–300° C., a sintered product is obtained that has a high effect in strength due to the addition of an auxiliary hardening material, a high dimensional accuracy, and good surface properties.

5. Binders containing an evaporable component:

The binders that solidify a slurry mixture confer to a hardened product a sufficient strength until the product is sintered and produce fine and continuous pores throughout a sintered body, by evaporating and eliminating an evaporable component from the hardened product during the drying and sintering processes. As the binders, a hydrolyzate of ethyl silicate (the solvent therefor is alcohol) and colloidal silica (the solvent therefor is water) are exemplified. The hydrolyzate of ethyl silicate is preferably used. That is because by adjusting the amount of a hardening agent, such as a water solution of ammonium carbonate, to be used to harden it, the hardening period of the hydrolyzate can be controlled very accurately and the hardening period from the start to the end is very short.

That is, by varying the amount of the hardening agent it is possible to harden a slurry mixture instantaneously after it is poured onto a pattern mold. First, these properties are very effective in preventing the segregation of the ingredients of the aggregate. Second, they decrease the time for the process since the effects can be obtained in a short time.

Also, since the hydrolyzate of ethyl silicate contains alcohol as an evaporable component, which has a good evaporability, the drying period that follows can be shortened and the silica content of the hydrolyzate of ethyl silicate improves the surface properties of a mold.

6. Drying process:

The drying process is conducted for the purpose of making the product porous by removing most of the evaporable component from the solid product obtained by solidifying the slurry mixture. The removal of the evaporable component brings about shrinkage of the solid.

The drying methods include, first, the method of allowing the solid to stand in the air; second, the method of drying it in a drying machine maintained at an increased temperature, and, third, the method of drying it in a vacuum-drying machine. The first method requires a long time to evaporate the evaporable component from the solid. And, since the rate of evaporation from the surface of the hardened product is fast while the rate of evaporation from its interior is slow, the difference between the degree of the drying of the surface and interior becomes very big, and the difference in the shrinkage generated thereby is liable to cause distortion and cracks. The drying period in the second method may be shorter than that in the first method. However, the difference between the rate of evaporation from the surface of the hardened product and that from its interior is liable to be caused as in the first method. Thus, when a very large article is treated, cracks are liable to be caused. By the third method the rate of the evaporation from the interior of the hardened product is rather fast, and thus hardly any difference between that rate and the rate of the evaporation from the surface is caused. Thus, cracks due to shrinkage when the product is dried are less likely to be generated. Specifically, the third method is effective in treating a large article. Thus to obtain a durable mold by the present invention the drying by vacuum-drying is preferred.

7. Sintering process:

The sintering process is conducted for purposes of the following actions:

That is, first is the action of completely evaporating the evaporable component that remains in the hardened product produced by the hardening of the slurry to make the product porous. Second is the action of sintering in an oxidizing atmosphere to oxidize and expand the metal powders to obtain oxidized and expanded metal powders by which the metal oxide powders are enveloped, and having, by diffusion-bonding, the surfaces of the oxidized and expanded metal powders and the metal oxide powders adhere. The third is the action of equalizing the dimensions of the sintered product with those of the pattern by expanding the metal powders by oxidation, although shrinkage is caused when the hardened product is dried and made porous. The fourth is the action of strongly bonding the ingredients of the aggregate as soon as cooling starts after the sintering is completed, by softening and melting the auxiliary hardening material, such as the frit that is scattered among the ingredients of the aggregate, to have the ingredients adhere.

The sintering temperature depends on the kind of metal powders and metal oxide powders, their compounding ratio, the porosity, strength, dimensional accuracy, surface properties, etc., of the sintered product. That is, the temperature should be one at which the metal powders start being oxidized and expanded, or higher, and should be one lower than the melting points of metal powders and metal oxide powders.

As a result of conducting various experiments by using various different hardening auxiliaries such as frit, it is found that when the sintering is conducted at 600°–1200° C. generally molds are obtained having good balance among the properties such as strength, gas-permeability, surface properties, and dimensional stability, which are required for durable air-permeable molds. When iron powders were used as the metal powders and powders of iron oxide powders were used as the metal oxide powders, the optimum sintering temperature was 600°–750° C.

The sizes of the materials used are explained below:
1. The grain sizes of metal and metal oxide powders:

Generally, the grain sizes are preferably about $300\mu$ or less. If the ingredients of the aggregate have grain sizes of more than $300\mu$, a fine pattern transference cannot be expected. Specifically, when fine transferability is required, ingredients of the aggregate are preferable of which 80% or more has grain sizes of 100 $\mu$m or less. However, if they are extremely fine they have drawbacks in being likely to produce cracks. The difference between the grain size of metal powders and that of metal oxide powders should be such that segregation is as little as possible. That is, the difference in the grain sizes should be one such that it would be difficult to have a difference between the sedimentation rate of the metal powders and that of the metal oxide powders. Generally, since the specific gravity of metal powders is greater than that of metal oxide powders, if the sedimentation rates of both powders are to be brought close such metal powders should be selected that have a grain size a little smaller than that of the grains of metal oxide powders. In any event, the minimum grain sizes of the metal and metal oxide powders, and the difference between the grain sizes of the metal and metal oxide powders, may be properly selected so that few cracks occur and so that little segregation of the aggregate ingredients in producing molds occurs.

2. The size of reinforcing fibers:

The size of the reinforcing fibers may be properly selected depending on the size of the mold and the design of its surface. For example, fibers having a length in the range of 1–30 mm and a thickness in the range of 20–400 $\mu$m may be selected. Those having lengths of 2–5 mm and thicknesses of 50–200 $\mu$m are more preferable since they provide good balance in properties such as prevention of cracks, mold strength, mold-surface properties, and dimensional stability.

The compounding ratio (ratio in weight) of the materials used in the present invention is explained below.

To make the aggregate the compounding ratio in the weight of metal powders to metal oxide powders is 5:95–30:70. An auxiliary hardening material is compounded in a weight ratio of 10–35 based on an aggregate of 100. A binder containing an evaporable component is mixed in a weight ratio of 10–25 based on 100 of the aggregate. When reinforcing fibers are added, they are added in a weight ratio of 5–25 based on an aggregate of 100. The reason why the ratio of the metal powders to the metal oxide powders of 5:95–30:70 is used is because the solid obtained from a slurry is shrunk upon drying, and if the ratio of metal powders is less than the above ratio, the dimensions of a mold cannot increase by oxidative expansion when the mold is sintered, so that the mold produced is smaller than the pattern. Also, if the percent of the metal powders is above that in the above ratio, the dimensions of the mold are increased too much by oxidative expansion.

The reason why the auxiliary hardening material is compounded in a weight ratio of 10–35 based on an aggregate of 100 is because if it is less than 10%, the function of the auxiliary hardening material to generate strength is insufficient, and if more than 35% the auxiliary hardening material upon sintering appears in a film form on the surface of a mold, or the gas permeability in the entire mold is lowered.

When reinforcing fibers are added, the reason why they are added in a weight ratio of 5–25 based on an aggregate of 100 is because if the ratio is less than 5%, a reinforcing effect, that is, an improvement in strength, or dimensional stability, cannot be expected. If the ratio is more than 25%, fiber balls are liable to be produced, and since too many fibers would be deposited on the surface of a mold and the uniform dispersion of the fibers would be difficult, it is likely to worsen the surface properties.

The reason why a binder containing an evaporable component is compounded in a 10–25 weight ratio based on an aggregate of 100 is because if the weight ratio is less than 10%, no good slurry would be obtained, and thus the transference of fine parts would be difficult upon pouring the slurry into a pattern mold. Also, since the amount of the evaporable component is reduced, assurance of gas permeability would be difficult. If the weight ratio is more than 25%, the slurry would contain too much liquid for the amount of the aggregate and thereby the sedimentation rate of the aggregate would be too high. Thus the segregation of metal and metal oxide powders would be more likely to take place.

To obtain a durable porous mold having the best balance among important properties, such as transference, surface properties, dimensional stability, strength, and cost, the following substances may be used in the following compounding ratio:

The aggregate can be obtained by compounding iron powders and iron oxide powders in a ratio of 10:90–20:80. As the reinforcing fibers, stainless fibers may be added in a ratio of 8–15 weight parts based on an aggregate of 100, and 15–25 weight parts of frit as the auxiliary hardening material, and 14–18 weight parts of an ethyl silicate hydrolyzate as the binder, may be added.

The durable air-permeable molds obtainable by the present invention will be explained below by reference to the attached figures:

FIGS. 1 and 2 are sectional views of a durable air-permeable mold M. FIG. 1 shows a mold that does not contain reinforcing fibers, while FIG. 2 shows one that contains reinforcing fibers 1. Both molds comprise a sintered body which uses as an aggregate metal powders and metal oxide powders. FIG. 2 shows that reinforcing fibers 1 are almost uniformly dispersed to reinforce the binding structure of the sintered body. As shown in FIG. 3, a sintered body comprises a binding structure of oxide grains 20 that are obtained by oxidizing metal powders, and metal oxide powders 21, and auxiliary hardening materials 23 that bind the ingredients of the aggregate in a form such that the materials envelope the parts around the bound parts, or in a form such that the auxiliary hardening materials fill parts of the spaces formed with the constituent substances.

Although the mechanism of producing this bound structure is not clearly understood, it is regarded that metal powders change to oxidized products and greatly increase their volumes, and diffusion bonding adhesion is conducted, at the boundaries of the oxidized products and metal oxide powders as sintering is conducted, in such a manner that the oxidized products envelope metal oxide powders.

Since the parts around the bound parts are further enveloped by auxiliary hardening materials which are softened and melted at a temperature used for the sintering and after filling parts of the spaces between the ingredients of the aggregate with auxiliary hardening materials and upon cooling the hardening materials are solidified to again form a glassy state, strong binding results in the sintered body.

The obtained sintered body has continuous fine pores 22 formed by the evaporable component in a binder escaping from the interior through the exterior into the air during the drying process and the sintering process. Due to the fine pores 22 and the bonding mechanism stated above, although the present durable mold is porous, it has a fine structure and a high strength, and good surface properties.

Although the properties of the obtained mold such as the porosity, the pore diameter, and the strength, change depending on compounding and sintering conditions, generally the mold provides properties such as a porosity of about 1–40%, a pore diameter of about 5–30%, and a compression strength of about 400–1,000 kg/cm$^2$.

EXAMPLE 1

20 molds for molding a door trim by the vacuum-molding method, having a size of 700 mm in length×1,000 mm in width×120 mm in maximum thickness, were produced. The conditions of the finished molds are shown in Table 1.

As the starting materials, iron powders containing 80% or more of grains of 44 μm or less and having a specific gravity of 7.8 g/cm$^2$, and iron oxide powders containing 80% or more of grains of 63 μm or less and having a specific gravity of 6.1 g/cm$^2$, frit having a melting point of 550° C., stainless fibers 3 mm in length×100μ in thickness, and an ethyl silicate hydrolyzate, were provided.

The iron powders and the iron oxide powders were compounded in a weight ratio of 15:85 to make an aggregate of 100. Stainless fibers in a weight ratio of 10 based on an aggregate of 100 were added. Based on the aggregate of 100, a weight ratio of 20 of frit and a weight ratio of 16 of an ethyl silicate hydrolyzate, to which a hardening agent was in advance added in an amount of 1 part based on 100 parts of the hydrolyzate, were added and mixed to obtain a slurry mixture. The thus-obtained slurry mixture was poured into a pattern mold and solidified to form a mold. The thus-obtained mold was released from the pattern mold and was heat-dried at 60° C. for 48 hours. Then the mold was sintered by increasing the temperature of the sintering furnace over 20 hours from the ordinary temperature to 600° C. and further increasing it over 4 hours from 600° C. to 650° C.

EXAMPLE 2

20 molds having the same size and weight as those in Example 1 were produced. The conditions of the finished molds are shown in Table 1.

As the starting materials, the same materials as those in Example 1 were provided. They were compounded in the same ratios as those in Example 1 and mixed to obtain a slurry mixture. The slurry was poured into a pattern mold and solidified to form a mold. The mold was released from the pattern mold and dried under −700 mmHg for 48 hours. Then the thus-obtained molds were sintered by increasing the temperature of the sintering furnace over 20 hours from the ordinary temperature to 600° C. and further increasing it over 4 hours from 600° C. to 650° C.

EXAMPLE 3

20 molds having the same size and the same weight as those in Example 1 were produced. The conditions of the finished molds are shown in Table 1.

As the starting materials, the same materials were used as those in Example 2, except that stainless fibers were excluded. The molding, drying, and sintering conditions were the same as those in Example 2.

COMPARATIVE EXAMPLE

Using the conventional technique, 20 molds having the same size and the same weight as those in Example 1 were produced. The conditions of the finished molds are shown in Table 1.

Iron powders containing 80% or more of grains of 44 $\mu$m or less and having a specific gravity of 7.8 g/cm$^2$, synthesized mullite powders containing 80% or more of grains of 74 $\mu$m or less and having a specific gravity of 3.1 g/cm$^2$, stainless fibers 3 mm in length $\times$ 100$\mu$ in thickness, and an ethyl silicate hydrolyzate, were provided as the starting materials.

The iron powders and the synthesized mullite powders were compounded in a weight ratio of 50:50 to make an aggregate of 100. Stainless fibers in a weight ratio of 10 based on an aggregate of 100 were added to the aggregate. Based on an aggregate of 100, an ethyl silicate hydrolyzate of a weight ratio of 18 was added and mixed to obtain a slurry mixture. The slurry was poured into a pattern mold and solidified to form a mold. The thus-obtained mold was released from the pattern mold and heat-dried at 60° C. for 48 hours. Then the mold was sintered by increasing the temperature of the sintering furnace over 18 hours from the ordinary temperature to 900° C. and then the temperature was kept at 900° C. for 6 hours.

TABLE 1

| | Ex. 1 | Ex. 2 | Ex. 3 | Comp. Ex. |
|---|---|---|---|---|
| Occurrence of cracks upon drying | 3 | 0 | 1 | 3 |
| Occurrence of cracks upon sintering | 0 | 0 | 1 | 3 |
| Surface irregularity of mold | 0 | 0 | 0 | 3 |
| Maximum and minimum deviation of dimensions of mold from standard dimensions (1,000) | 1,001 to 999 | 1,001 to 999 | 1,002 to 999 | 1,005 to 998 |

As is clearly shown in Table 1, the durable air-permeable molds that were prepared by the present invention have a superior quality as compared with the molds prepared in a conventional technique in that fewer cracks develop upon sintering, less irregularity on the surface of a mold exists, and the dimensional accuracy of the mold for the pattern is extremely good. They are shown to resolve all the conventional problems. From Example 1, in which the drying was done by heat drying, and Example 2, in which the drying was done by vacuum drying, it is shown that when vacuum drying is done no cracks occur at all, and thus vacuum drying is extremely effective. When Example 2, in which reinforcing fibers are added, and Example 3, in which reinforcing fibers are not incorporated, are compared, it is seen that no cracks occur in the mold obtained in Example 2. This shows that reinforcing fibers are effective in preventing cracks. The Table also shows that reinforcing fibers are effective in improving dimensional accuracy.

EXAMPLE 4

20 molds for vacuum molding to produce covers for machine parts having a size of 100 mm in length $\times$ 150 mm in width $\times$ 60 mm in its maximum thickness, and a weight of 2 kg, were produced as stated below. The conditions of the finished molds are shown in Table 2.

As the starting materials, the same materials as those in Example 1 were provided. They were compounded in the same ratios as those in Example 1 and mixed to obtain a slurry mixture. The slurry mixture was then poured into a pattern mold and solidified to form a mold. The thus-obtained mold was released from the pattern mold and dried at the ordinary temperature for 48 hours. Then the mold was sintered by increasing the temperature of the sintering furnace over 10 hours from the ordinary temperature to 600° C. and further increasing it over 4 hours from 600° C. to 650° C.

EXAMPLE 5

20 molds having the same size and the same weight as in Example 4 were produced as stated below. The conditions of the finished molds are shown in Table 2.

The molding conditions, such as the starting materials and the compounding ratio of the materials, and the sintering conditions, were the same as those in Example 4 except that, for only the drying condition, the mold released from the pattern mold was dried under $-700$ mmHg for 24 hours to form a mold.

TABLE 2

| | Ex. 4 | Ex. 5 |
|---|---|---|
| Occurrence of cracks upon drying | 0 | 0 |
| Occurrence of cracks upon sintering | 0 | 0 |
| Nonuniformity of surface of mold | 0 | 0 |
| Maximum and minimum deviations of dimensions of mold from standard dimensions (100) | 100.1 to 99.9 | 100.1 to 99.9 |

As shown in Table 2, in the production of relatively small molds, regarding cracks no difference occurred between vacuum drying and drying in the natural atmosphere.

Figure 1:
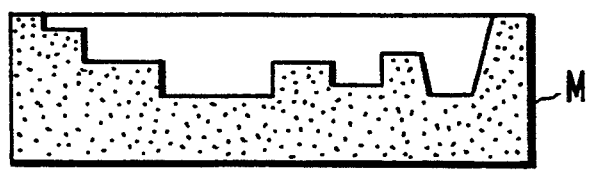
FIG. 1 is a sectional view that shows one example of durable air-permeable molds that are obtained by the present invention.
Figure 2:
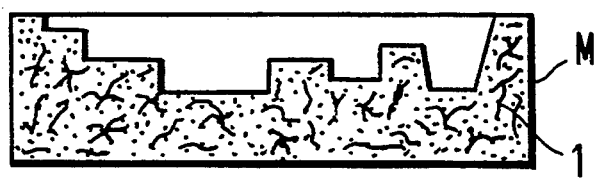
FIG. 2 is a sectional view that shows a durable air-permeable mold prepared by the present invention in which reinforcing fibers are incorporated. In this Figure, 1 shows reinforcing fibers.
Figure 3:
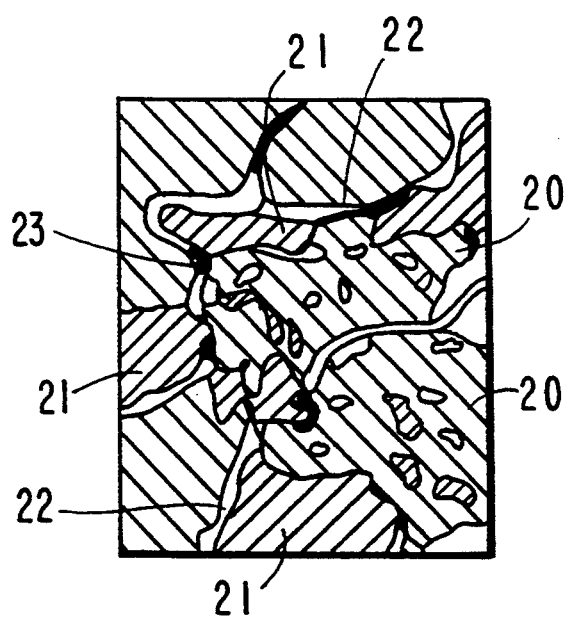
FIG. 3 is an enlarged sectional view of the structure of the durable air-permeable mold of FIG. 1. In this Figure, 20, 21, 22, and 23 show oxide grains obtained by oxidizing metal powders, metal oxide powders, fine pores, and auxiliary hardening materials, respectively.

We claim:

1. A method of preparing a durable air-permeable mold characterized by compounding 100 parts by weight of an aggregate containing metal powders and metal oxide powders in a weight ratio of 5:95 to 30:70, the metal of said metal oxide powders being the same as that of the metal powders, 80% or more of said metal powders and said metal oxide powders having grain sizes of 300 $\mu$m or less, 10 to 35 parts by weight of an auxiliary hardening material that is softened and melted during the process of sintering, and 10 to 25 parts by weight of a binder that contains an evaporable component, mixing the thus-obtained compound to form a slurry mixture, pouring the slurry mixture into a pattern mold and solidifying the mixture to form a mold, releasing the thus-obtained mold from the pattern mold, drying the thus-obtained mold to confer porosity to the mold, and sintering it at a temperature of 600° to 1,200° in an oxidative atmosphere.

2. A method of preparing a durable air-permeable mold of claim 1 wherein 5 to 25 parts by weight based on 100 parts of an aggregate, of reinforcing fibers are added.

3. A method of preparing a durable air-permeable mold of claim 2 in which the metal powders are iron powders, the metal oxide powders are iron oxide powders, the reinforcing fibers are fibers of a stainless material, and the binder that contains an evapotable component is a hydrolyzate of ethyl silicate.

4. A method of preparing a durable air-permeable mold of any of claims 1, 2, and 3 in which the method of drying after releasing the mold from the pattern mold is vacuum drying.

* * * * *

UNITED STATES PATENT AND TRADEMARK OFFICE
CERTIFICATE OF CORRECTION

PATENT NO. : 5,405,570
DATED : April 11, 1995
INVENTOR(S) : Fuma et al.

It is certified that error appears in the above-indentified patent and that said Letters Patent is hereby corrected as shown below:

Abstract, line 2, change "clue" to --due--

Column 5, line 18, insert a comma --,-- after "invention"

Column 8, line 8, change "5-30%" to --5-30µ--

Column 11, line 1, change "1,200°" to --1,200°C--

Signed and Sealed this

Twenty-sixth Day of September, 1995

Attest:

BRUCE LEHMAN

Attesting Officer    Commissioner of Patents and Trademarks